May 7, 1957 O. A. KERSHNER 2,791,295
SELF-ADJUSTING MECHANICAL BRAKE-OPERATING
MEANS FOR DISC BRAKES AND THE LIKE
Filed April 16, 1956 4 Sheets-Sheet 1

INVENTOR.
O. A. Kershner
BY
Robb & Robb
Attorneys.

May 7, 1957 O. A. KERSHNER 2,791,295
SELF-ADJUSTING MECHANICAL BRAKE-OPERATING
MEANS FOR DISC BRAKES AND THE LIKE
Filed April 16, 1956 4 Sheets-Sheet 3
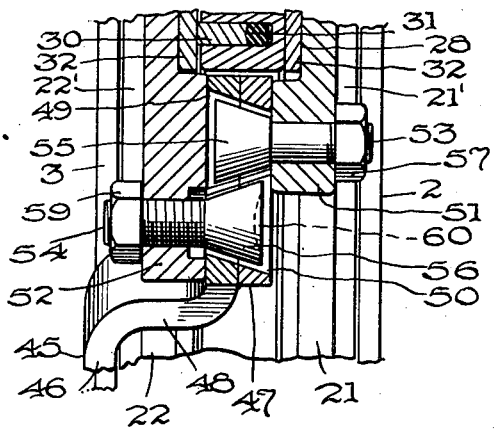
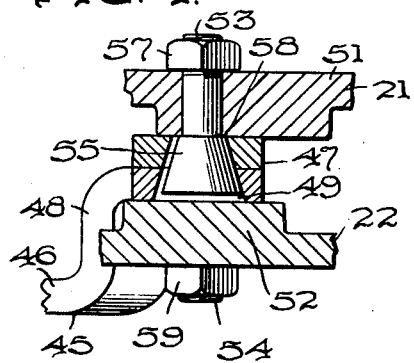
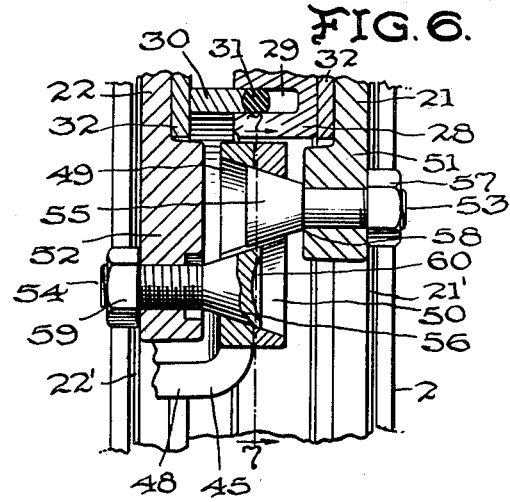
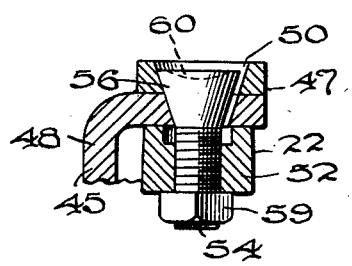
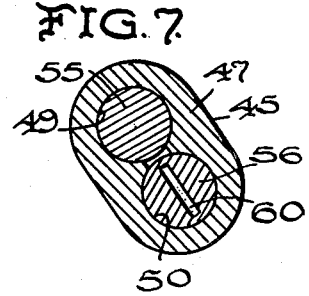
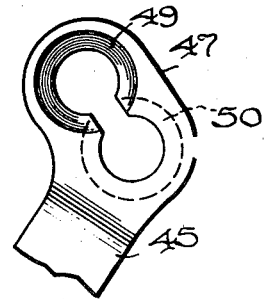
INVENTOR.
O. A. Kershner
BY
Robert Cobb
Attorneys.

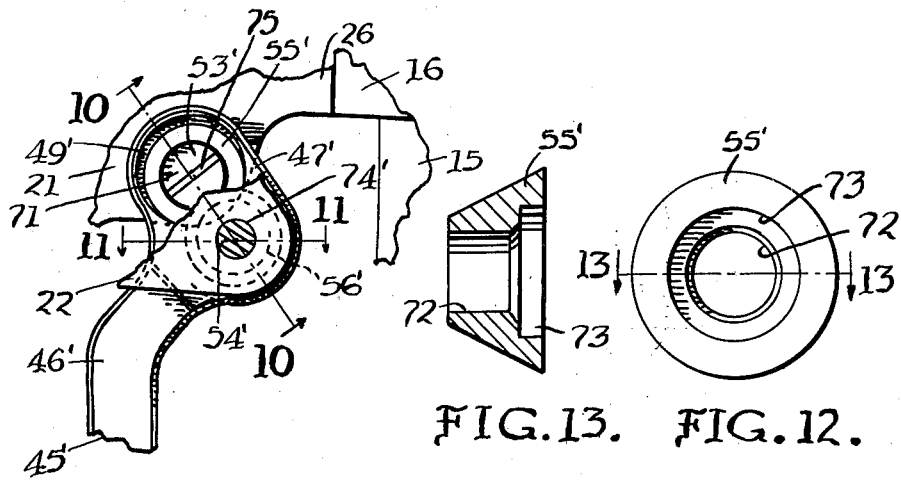
FIG. 9. FIG. 13. FIG. 12.
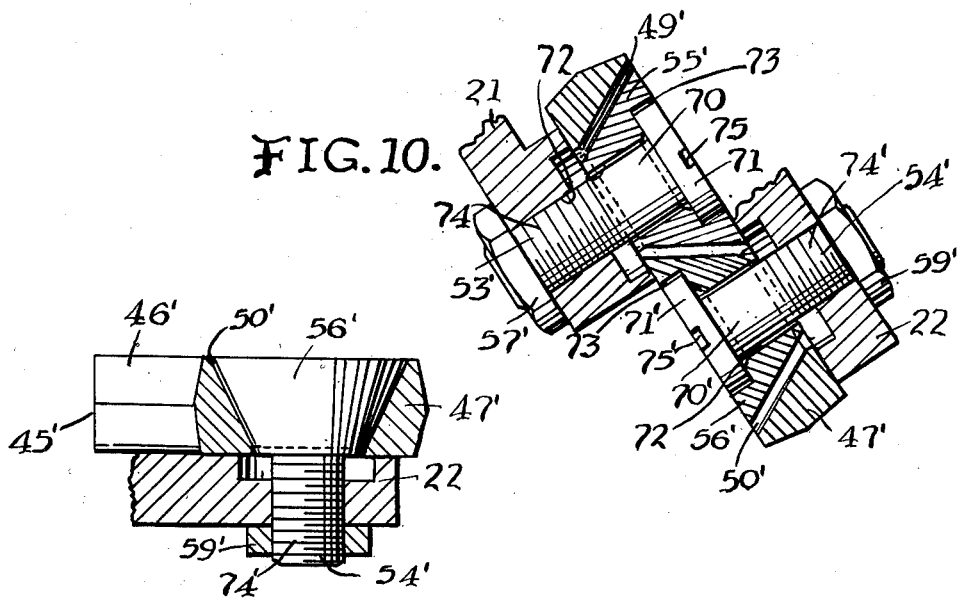
FIG. 10.
FIG. 11.
Inventor
O. A. Kershner
By Cobb & Cobb
Attorneys United States Patent Office 2,791,295
Patented May 7, 1957

2,791,295

SELF-ADJUSTING MECHANICAL BRAKE-OPERATING MEANS FOR DISC BRAKES AND THE LIKE

Osborn A. Kershner, St. Joseph, Mich., assignor, by mesne assignments, to Lambert Brake Corporation, St. Joseph, Mich., a corporation of Michigan Application April 16, 1956, Serial No. 578,335

25 Claims. (Cl. 188—72)

This application is a continuation-in-part of my copending application Serial No. 508,370, filed May 16, 1955.

The present invention relates to self-adjusting disc brakes and operating means therefor, and more particularly to a self-adjusting disc brake having self-adjusting brake-operating means, wherein automatic adjustment of the brake responsive to wear of the friction discs effects automatic adjustment of the operating mechanism.

Highly effective fluid-operated motor vehicle brakes of the disc type have been heretofore developed, including means for automatically compensating for wear of the discs. Such automatic adjustment minimizes the need for personal attention to the brakes, except when relining of the discs is required. Some of these brakes have also been provided with auxiliary mechanical operating means which permit their use as emergency or parking brakes.

The primary object of the present invention is to provide a self-adjusting disc brake, as aforesaid, with a novel mechanical operator which is itself adjusted by automatic adjustment of the brake, so that the need for periodic manual adjustments of the mechanical operating mechanism is avoided.

In pursuance of this objective, the mechanical operating means includes a pivotal lever which is interconnected with a pair of slightly relatively rotatable and axially shiftable discs, these discs being disposed in a rotatable housing and being adapted to engage opposed friction surfaces in the housing when the discs are spread axially apart by camming means between the discs. Preferably, the invention includes a lever which is pivotally connected to one disc adjacent to the end of the lever and pivotally connected to the other disc at a point spaced from the first-mentioned pivotal connection, the lever having an operating arm which is adapted to be connected to conventional manually controlled emergency brake operating means operable from the driver's seat of a vehicle.

A further object is to provide such a mechanical brake operating means, as aforesaid, which is so pivotally connected to the discs that, as the brake wears and such wear is compensated for by adjustment of the brake, the respective pivotal connections respond to such adjustment, so that the operating arm of the lever is automatically maintained in substantially the same brake-release position throughout the life of the brake, and the range of operating movement of the lever is maintained substantially constant and is minimized. As the result, the manually controlled emergency brake operating means needs no adjustment to compensate for wear of the brakes, as has heretofore been necessary in the case of conventional automobile brakes which are utilized as service brakes, as well as for emergency or parking brakes.

The invention further contemplates the advantage of permitting the utilization of the self-adjusting mechanical operating means for operation of disc brakes as aforesaid, without the use of other means for effecting brake operation; and such mechanical operating means could be advantageously employed in brakes which are adjusted by other than automatic means, as well as in other specifically different brakes than that herein disclosed for illustrative purposes.

Another object is to provide a disc brake which is fully self-adjusting and self-energizing responsive to service applications, and which is also fully self-adjusting and self-energizing responsive to emergency or parking applications.

Still another object is to provide novel auxiliary operating means to initiate emergency and parking brake applications in disc brakes having serious problems of space limitations, said auxiliary operating means being adapted to occupy a minimum of space and requiring a minimum of additional space for operating clearance.

Other objects and advantages of the invention will be hereinafter described or will become apparent to those skilled in the art, and the novel features thereof will be defined in the appended claims.

In the accompanying drawings:

Fig. 3 is an enlarged fragmentary view in section, as taken on the line 3—3 of Fig. 1, and showing the connection of the mechanical operator to the discs;

Fig. 4 is a view in section, as taken on the line 4—4 of Fig. 1;

Fig. 5 is a view in section as taken on the line 5—5 of Fig. 1;

Fig. 6 is a view corresponding to Fig. 3, but illustrating the positions assumed by the respective parts when the brake is substantially fully worn;

Fig. 7 is a view in section, as taken on the line 7—7 of Fig. 6;

Fig. 8 is a fragmentary detail view of the end of the brake operating arm which is adapted to be connected to the discs;

Fig. 9 is a fragmentary view in elevation, with certain of the parts broken away, and showing a modified mechanical operating means in accordance with the invention;

Fig. 10 is an enlarged view in section, as taken on the line 10—10 of Fig. 9;

Fig. 11 is an enlarged view in section, as taken on the line 11—11 of Fig. 9;

Fig. 12 is a detail view in elevation of a tapered roller member employed in the mechanical operating means of Fig. 9; and Fig. 13 is a view in section, as taken on the line 13—13 of Fig. 12.

Like reference characters in the several figures of the drawings and in the following detailed description designate corresponding parts.

Figure 1:
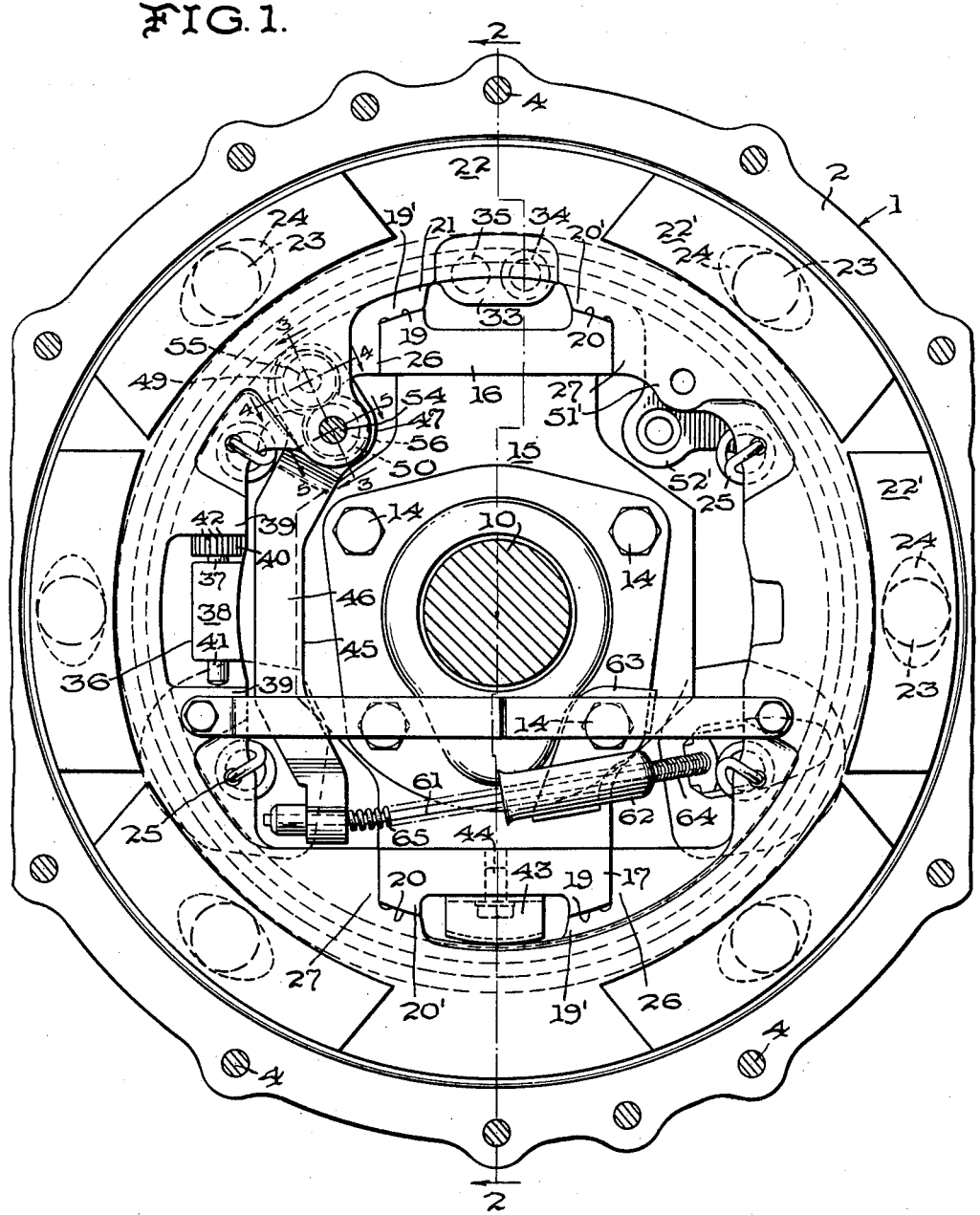
Fig. 1 is a view showing a brake according to the present invention, with the outboard side of the housing broken away to disclose the inner double-disc assembly in elevation, and with certain of the parts shown in section as taken on the line 1—1 of Fig. 2, this view showing one embodiment of the self-adjusting mechanical operating means hereof.
Figure 2:
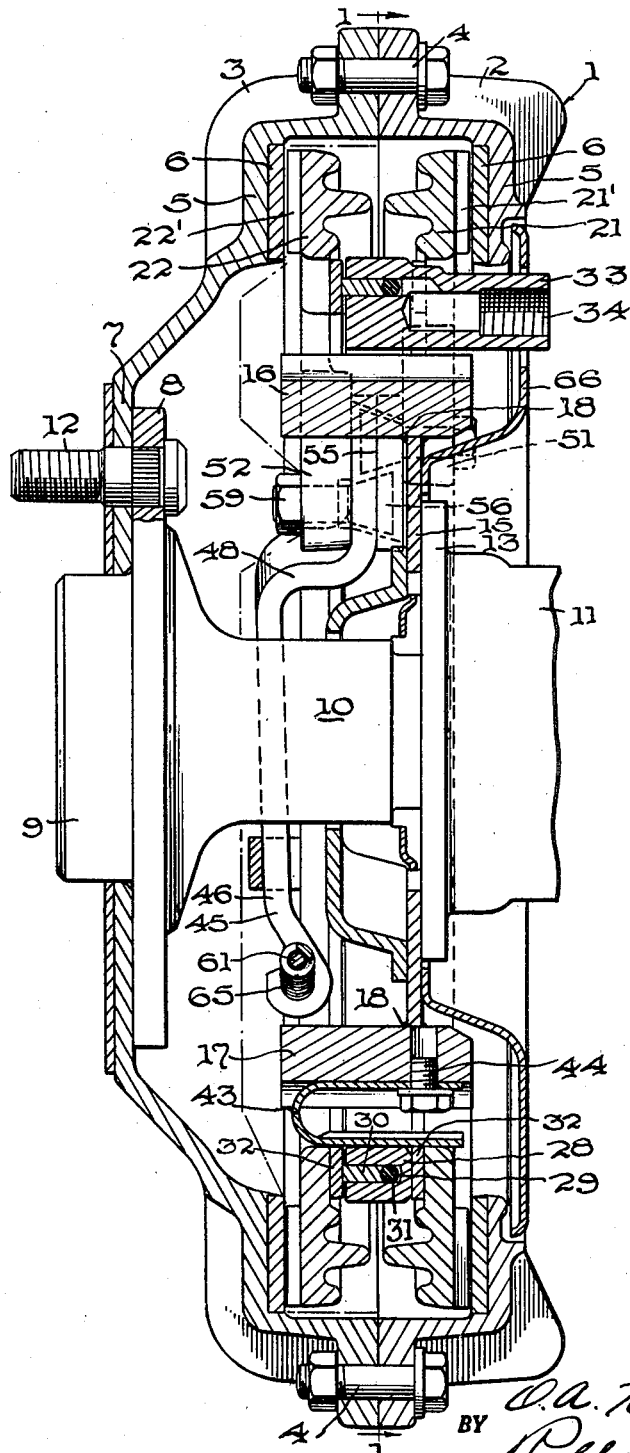
Fig. 2 is a view in vertical section, as taken on the line 2—2 of Fig. 1, but on a slightly enlarged scale.

Referring first to Figs. 1 and 2, the disc brake assembly includes a rotatable housing 1, consisting of an inboard housing section 2 and an outboard section 3 abutting at their outer margins and secured together as by means of a plurality of fasteners 4, or the like. Each housing section is formed with a radially extended wall 5, these walls 5 being disposed in axially spaced relation to one another, and preferably being lined with suitable wear-resistant friction elements 6. The outboard housing section 3 is provided with a radially inwardly extended flange 7 adapted to be connected to an annular flange 8 on a wheel-supporting hub 9 of an axle 10 which extends axially through the housing and into an axle casing 11 in which it is suitably supported for rotation in the case of application to the rear wheel of an automobile. A suitable number of studs 12 are carried by the flange 8 and project through the flange 7 on the housing section 3 so as to connect the housing 1 to the axle 10 for rotation therewith, and so as to afford means for securing a vehicle wheel (not shown) on the hub 9.

The axle casing 11 is also formed with a radially extended flange 13 to which is suitably connected, as by means of a suitable number of bolts 14, a backing or adapter plate 15. This adapter plate 15 is preferably provided in diametrically opposite positions with an upper disc-supporting lug 16 and a lower disc-supporting lug 17, these lugs 16 and 17 preferably being welded to the outer periphery of the plate 15, as at 18. The respective disc-supporting lugs 16 and 17 are provided with diametrically opposite, circumferentially extended bearing surfaces 19 adjacent to one end thereof, and a similar pair of circumferentially extended bearing surfaces 20 adjacent to the respective opposite end thereof.

Shiftably mounted upon the supporting lugs 16 and 17 is an inner double-disc assembly, this double-disc assembly including an inboard disc 21, an outboard disc 22, a plurality of circumferentially spaced camming balls 23 disposed in oppositely inclined ramped seats 24 formed in the opposing faces of the discs, and a plurality of circumferentially spaced tension springs 25 which resiliently urge the discs towards one another and maintain the balls 23 trapped in the seats 24 between the discs. On its inner periphery, the inboard disc 21 is formed with a pair of diametrically disposed bearing extensions 19' which are complementary to and slidably mounted upon the bearing surfaces 19 on the disc-supporting lugs 16 and 17, and the outboard disc 22 is also provided with a pair of similar bearing extensions 20' which are complemental to and slidably mounted on the bearing surfaces 20 of the lugs 16 and 17. Adjacent to the respective bearing extensions 19', the inboard disc 21 is also provided with a stop projection 26 engageable with each of the lugs 16 and 17 to prevent rotation of the disc 21 in a clockwise direction, as viewed in Fig. 1. Similarly, the outboard disc 22 is formed on its inner periphery adjacent to the respective bearing extensions 20' with a stop projection 27 adapted to engage the respective supporting lugs 16 and 17 to preclude rotation of the disc 22 in a counterclockwise direction, as viewed in Fig. 1. Accordingly, it will be seen that the double-disc assembly as a whole is not free to rotate on the supporting lugs 16 and 17, but the respective discs 21 and 22 are free to rotate in one direction or the other in order to effect self-energization of the brake in a manner which will hereinafter be more fully described.

Service actuator means are provided for shifting the discs 21 and 22 into engagement wtih the opposed inner faces of the housing 1, and this operating means is preferably in the form of an annular fluid-pressure-operated actuator device including an annular member 28 which is disposed between the discs and constitutes an actuator cylinder having an annular piston chamber 29 therein. Shiftably mounted in the chamber 29 is an annular piston 30 which projects from the piston chamber towards the disc 22, and the chamber 29 is sealed against leakage of fluid as by means of an annular sealing element 31 which is engaged with the inner end of the piston 30. Preferably interposed between the disc 22 and the piston 30, and between the annular actuator member 28 and the disc 21, is a pair of annular insulating elements 32, 32 which guard against the transmission of heat generated during braking to the actuator device.

Preferably adjacent to the top thereof, the annular member 28 is provided with an axially extended neck 33 having suitable passages therein for establishing communication between the piston chamber 29 and a source of fluid under pressure through a suitable tube (not shown) adapted to be connected in the threaded opening 34 in the outer extremity of the neck 33. Also extending through the neck 33 and communicating with the piston chamber 29 is an opening 35 which is adapted to be provided with a conventional valved bleeder to permit the bleeding of air from the piston chamber 29 when a hydraulic fluid medium is utilized to operate the same.

When fluid pressure is admitted to the piston chamber 29, the annular actuator device will expand and shift the discs 21 and 22 axially apart and into engagement with the friction surfaces 6, 6 of the housing 1. Upon initial engagement of the discs with the housing, one disc or the other, depending upon the direction of rotation of the housing, will tend to "clock" along with the housing, thereby effecting a powerful torque-responsive self-energization of the brake through the camming action of the balls 23 in the ramped seats 24. After repeated braking operations, the friction lining material designated 21' and 22', respectively on the inboard and outboard discs 21 and 22, will wear down, thus necessitating that the discs shift farther apart in order to effect engagement of the brakes, thus slowly increasing the distance which the discs must move in order to engage the friction surfaces in the housing. In order to compensate for such wear, the brake is preferably provided with automatic adjuster means generally designated 36, such automatic adjuster means preferably being in the form of an adjuster screw 37 which is threadedly mounted in a screw-supporting lug 38 carried by the inboard disc 21. Disposed for abutment with the opposite ends of the screw 37 is a pair of abutments 39, 39 on the inner periphery of the outboard disc 22. One end of the screw 37 is provided with an enlarged head 40, while the other end of this screw is provided with a rounded end 41. The head 40 of the screw 37 is preferably provided with circumferentially spaced teeth or serrations 42 adapted to be engaged by a suitable pawl or dog (not shown) so that the screw 37 will be limited to rotation in one direction only. Accordingly, when the outboard disc 22 rotates in a clockwise direction, responsive to drag torque of the housing 1, the screw 37 will be caused to back out of the supporting lug 38, but rotation of the disc 22 in the opposite direction is limited by the screw. However, there is a slight gap between the screw head 40 and the abutment 39 adjacent thereto when the brake is engaged, so as to provide for release clearance of the brake. Thus, it will be noted that progressive wear of the friction lining material 21' and 22' is progressively compensated for by the adjuster 36. Preferably, a similar adjuster is also provided in diametrically spaced relation to the adjuster shown in Fig. 1, and therefore, the discs 21 and 22 may be identical with one another and merely disposed in back-to-back relation.

In order to eliminate any rattle of the double-disc assembly on the supporting lugs 16 and 17 as may be caused by manufacturing tolerances, a generally U-shaped spring 43 is preferably secured beneath the lug 17, as by means of a screw 44 or the like. This spring 43 bears downwardly upon the inner peripheries of the discs 21 and 22 and maintains the bearing extensions 19' and 20' at the upper side of discs 21 and 22 in tight engagement with the bearing surfaces 19 and 20 on the upper supporting lug 16. Thus, vibration of the double-disc assembly on the supporting lugs 16 and 17 is prevented.

According to the primary objective of the invention, mechanical operating means are provided for effecting rotation of one disc relative to the other to effect actuation of the double-disc assembly through the camming action of the balls 23. This is preferably attained by the provision of a lever 45 having an elongated operating arm 46 which is preferably provided with an angularly disposed head 47 which is offset from the arm 46, as at 48, so that the head 47 is disposed on a plane extending generally midway between the discs, while the arm 46 may be located in the free space between the flange 8 of hub 9 and the brake backing plate 15.

Referring particularly to Figs. 3 through 8, the head 47 is provided with a pair of similar generally conical or tapered recesses 49 and 50 having parallel axes disposed in spaced relation. These recesses 49 and 50 taper in opposite directions so that with the head 47 disposed between the discs 21 and 22, the recess 49 converges towards the inboard disc 21, while the recess 50 converges towards the outboard disc 22. The inboard disc 21 is provided with an inwardly projecting ear 51 on its inner periphery, and the outboard disc 22 is formed with an inwardly projecting ear 52 on its inner periphery, with the ear 52 extending inwardly a distance greater than the ear 51. Head 47 of operating arm 45 is disposed between the ears 51 and 52 and connected to the respective ears by means of a pair of pivot elements or bolts 53 and 54, respectively, these bolts having enlarged tapered heads 55 and 56, respectively. The bolt 53 extends through an opening in the ear 51 on the disc 21 and is secured therein as by means of a nut 57 which pulls a shoulder 58 at the base of the tapered head 55 into tight abutting contact with the ear 51, and the head 55 is disposed in the conical depression 49 in the head 47, so that the lever 45 is pivotally mounted upon the pivot element or bolt 53. The pivot element or bolt 54 is secured in a threaded opening in the ear 52 and locked in position by a lock nut 59, whereby the position of the bolt 54 may be varied by loosening the lock nut 59 and rotating the bolt 54 as by means of engagement of a suitable tool (not shown) in a slot 60. The head 56 of pivot element or bolt 54 is disposed in the conical recess 50 in the head 47, so that the operating lever 45 is also pivotally mounted upon the bolt 54.

The discs 21 and 22 are respectively provided with inwardly projecting ears 51' and 52', as clearly shown in Fig. 1, which are adapted to be connected with an operating lever 45 similar to that just described, whereby the brake assembly may be readily utilized as a righthand wheel brake or a lefthand wheel brake. This arrangement further facilitates the manufacture of the discs by permitting the discs to be identical with one another, thereby requiring the manufacture of only a single form of disc and enabling the utilization of a pair of such identical discs in the double-disc assembly.

It will now be recognized that, since the outboard disc 22 is anchored against rotation in a counter-clockwise direction by abutment 27 thereon, and since inboard disc 21 is held against clockwise rotation by the abutment 26 thereon, movement of the actuator arm 46 to the right, as viewed in Fig. 1, will effect pivotal movement of the arm 46 about pivot element or bolt 53, with the result that pivot element or bolt 55 will effect slight rotative movement of the disc 22 in a clockwise direction. Therefore, such operation of the operating arm 46 will effect axial separation of the discs through the camming action of the balls 23 in the ramped seats 24, with the result that the brake will be engaged. Such movement of the operating arm 46 is preferably attained through the use of a conventional manually operable emergency brake flexible cable 61 which is connected to the free end of operating arm 46 in any suitable or well-known manner, as illustrated in Figs. 1 and 2. Preferably, the flexible cable 61 extends through a suitable cable guide 62 which is rigidly mounted on a bracket 63, this bracket 63 being suitably supported, as by connection to one of the fasteners 14 previously referred to. At the inboard side of the brake assembly, there is preferably provided a closure or splash plate 66 for closing the inboard side of the housing 1 against the entry of water, mud, and other foreign material, and the flexible cable 61 is preferably disposed in a flexible shield 64 which extends into the brake housing through the splash plate 66, as viewed in Fig. 1. In order to resiliently bias the operating arm 46 to the position shown in Fig. 1, a coiled compression spring 65 preferably encircles the cable 61 and is interposed between the free end of the operating lever 45 and the cable guide 62.

The tapered heads 55 and 56 of the pivot elements or bolts 53 and 54 are so proportioned that in a brake assembly in which the friction lining material 21' and 22' is either new or has not worn appreciably, the tapered heads 55 and 56 do not fully seat in the correspondingly tapered recesses 49 and 50 in the head 47 of operating lever 45, as illustrated in Fig. 3. Accordingly, as the brake is being engaged by the operating lever 45, the tapered heads 55 and 56 assume an eccentric relationship to the tapered recesses 49 and 50 and make only a line contact therewith at opposite sides of the respective recesses 49 and 50. This eccentric relationship of the tapered heads 55 and 56 in the recesses 49 and 50 is best recognized by reference to Figs. 1, 4 and 5.

However, as the friction linings 21' and 22' progressively wear, and automatic adjustment of the axial separation of the discs is effected by the self-adjusters 36, the tapered heads 55 and 56 will move progressively deeper into the recesses 49 and 50 and therefore slowly approach a concentric relationship with the recesses 49 and 50, so that rotative displacement of one disc relative to the other is compensated for, and the brake-release position of the operating lever 45 remains substantially constant, while the effective fulcrum point of the lever 45, namely, the line contact of tapered head 56 in the tapered recess 50, shifts rotatively about the axis of the brake assembly in the direction of rotation of outboard disc 22, while the point of thrust on tapered head 55, namely, the line contact between tapered head 55 and tapered recess 49, shifts rotatively slightly in the direction of rotation of the inboard disc 21.

It is to be understood that depending upon space limitations in a given brake assembly, and depending upon the distance between the tapered recesses 49 and 50 in the head 47 of lever 45 requisite to operation of a particular brake, the distance between the recesses 49 and 50 and the relative positioning of the pivot elements or bolts 53 and 54 may be varied to correspondingly vary the mechanical advantage of the lever 45. Such variation in the mechanical advantage of the lever 45 will have a direct bearing upon whether the operating arm 46 of the lever 45 remains in precisely the same brake-release position, or whether the arm 46 slightly changes its brake-release position. Accordingly, the appended claims are intended to embrace a structure wherein the adjustment of the position of the mechanical operator is complete or merely a partial adjustment, i. e., the operating member remains in a constant brake-release position or it slightly moves from this position as the brake linings wear down.

In Fig. 6, there is illustrated the relative positions which would be assumed by the tapered heads 55 and 56 of the pivot elements 53 and 54 in the respective tapered recesses 49 and 50 in a disc brake according to the foregoing in which the lining material 21' and 22' has become fully worn, and it will be seen that the tapered heads 55 and 56 are fully seated in the tapered recesses 49 and 50. However, this view is exaggerated for the purpose of clear illustration, and from a practical standpoint, the pivot elements 53 and 54 would be so proportioned and the pivot element 54 so adjusted by its threaded mounting in the ear 52 that the tapered heads 55 and 56 would never reach a point where they have complete concentric engagement in the recesses 49 and 50, at which time further automatic adjustment would be precluded.

Referring to Figs. 9 through 13, a modified construction of the pivot elements is shown, and primed reference numerals are utilized to designate the parts of the mechanical actuator or brake-operating means which correspond to those previously described.

This modified construction prevents or minimizes frictional resistance to actuation of the brake. To accomplish this result, the tapered heads 55' and 56' of the respective pivot elements 53' and 54' are in the form of tapered roller elements which are journaled for rotation on unthreaded shank or stem portions 70, 70' of the pivot elements 53' and 54'. To retain the tapered elements or rollers 55' and 56' in place, the shanks 70, 70' are each provided with flat or otherwise suitably formed heads 71, 71', respectively.

The roller elements 55' and 56' are each provided with a central opening 72 therethrough for accommodating the shanks 70, 70', as is best seen in Figs. 12 and 13 which show the roller element construction in detail. At the large ends of the rollers 55', 56', they are each also provided with an enlarged counterbore 73 complementally formed to receive one of the heads 71, 71'.

In order to effect manual adjustment of the operating means, if such manual adjustment be necessary in a particular application, the pivot elements respectively have a shank or stem portion 74, 74' threadedly mounted in complementally threaded openings in the supporting portions of the discs 21 and 22. Jam nuts 57' and 59' are preferably utilized on the threaded stems 74, 74' to secure the pivot elements against undesired movement, and adjustment can be readily effected by virtue of the provision of suitable tool-receiving means in the heads 71, 71', such as screw driver slots 75, 75'. It will be understood that threaded adjustment of only one of the pivot elements will suffice to effect adjustment of the operating means, as has been previously described, but by providing similar connections of the respective shanks 74, 74' with the discs 21 and 22, identical parts may be employed, with consequent savings in time, expense, and labor in manufacturing, assembling, and repairing the actuator means.

The operation of the form of Figs. 9 to 13 is the same as has been previously described, except that rolling contact of the rollers 55' and 56' in the openings or recesses 49' and 50' respectively, in the operating head 47' eliminates frictional resistance to pivotal brake-operating movements of the head 47' and likewise minimizes frictional resistance to relative axial movements of the discs 21 and 22.

Moreover, while the illustrative brake is self-adjusting, it is to be understood that the self-adjusting mechanical brake operator herein disclosed is not necessarily limited to use with self-adjusting brakes, but may be utilized in association with manually adjusted brakes, under which circumstances, manual adjustment of the brake discs will effect simultaneous adjustment of the position of the operating arm 46 or 46'. It is also to be understood that the mechanical operating means herein disclosed is not necessarily limited to use as an auxiliary operator in combination with service brake operating means such as the annular hydraulic actuator herein disclosed, since the operating lever 45 or 45' and its novel connection to the discs may be employed as the only brake operating means, if desired in certain applications.

While the specific details of the invention have been herein shown and described, changes and alterations may be resorted to without departing from the spirit thereof as defined in the appended claims.

I claim:

1. The combination with a brake having a pair of relatively stationary friction members shiftable into engagement with a rotatable element to be braked and having means for adjusting the release position of said friction members, of operating means for shifting said friction members into engagement with said rotatable element, said operating means including an operating member interconnected with said friction members, and said operating member and said friction members having cooperative means for adjusting the operating member responsive to adjustment of the friction members to maintain the operating member in a substantially constant brake release position, said operating member having the form of a lever, and the adjusting means for the operating member including means adjustably mounting said lever on one of the friction members, said mounting means including a tapered pivot element on one member, the other member having a tapered opening in which the pivot element is eccentrically disposed to provide an adjustable fulcrum point which is adjusted responsive to adjustment of the friction members.

2. The combination as defined in claim 1, wherein the pivot element is carried by one of said friction members, and said opening being formed in said lever.

3. The combination with a brake having a pair of relatively stationary friction members shiftable into engagement with a rotatable element to be braked and having means for adjusting the release position of said friction members, of operating means for shifting said friction members into engagement with said rotatable element, said operating means including an operating member interconnected with said friction members, and said operating member and said friction members having cooperative means for adjusting the operating member responsive to adjustment of the friction members to maintain the operating member in a substantially constant brake release position, said operating member having the form of a lever, means pivotally connecting said operating member to the respective friction members, said connecting means including a pivot element carried by one member, the other member having a recess in which the pivot element is adjustably and eccentrically disposed for adjustment of such eccentricity responsive to adjustment of the friction members.

4. In combination, a disc brake including a rotatable element to be braked having radially extended and axially spaced friction surfaces, supporting means, a double-disc assembly carried by said supporting means and disposed between the friction surfaces of said element to be braked, said double-disc assembly including a pair of discs shiftably mounted on said supporting means for relative rotative and axial shifting movements, camming means between the discs for forcing the discs into engagement with the friction surfaces of the element to be braked upon rotation of one disc relative to the other, adjusting means for preventing return movements of said discs beyond a predetermined position of release clearance relative to the rotatable element aforesaid, and mechanical operating means for shifting one of said discs rotatively relative to the other, said operating means including a pivotal member, said discs each having a member to which the pivotal member is connected, and said members having cooperative means responsive to adjustment of said discs for maintaining the pivotal member in a substantially constant brake release position.

5. The combination as defined in claim 4, wherein the pivotal member has the form of a lever having an operating arm adapted to be connected to means for operating the lever.

6. The combination as defined in claim 4, wherein the pivotal connection of the pivotal member to one disc member includes a pivot element carried by one member and having a tapered head, the other member having a recess in which said tapered head is eccentrically disposed, said tapered head being in contact with the recessed member at one side of the recess, and said tapered head shifting axially in said recess responsive to axial movement of the discs.

7. The combination as defined in claim 4, wherein the pivotal connection of the pivotal member to one disc member includes a pivot element carried by one member and having a tapered head, the other member having a complementally tapered recess in which said tapered head is eccentrically disposed, said tapered head being in line contact with the recessed member at one side of the recess, and said tapered head shifting axially in said recess responsive to axial movement of the discs.

8. The combination as defined in claim 4, wherein the pivotal member has the form of a lever having a head thereon, said head having a pair of recesses therein, and the members on the discs each having a tapered end disposed in the respective recesses, with the tapered ends eccentrically disposed in the recesses and engaged with the head at the respective opposite sides of the recesses, whereby pivotal movement of the lever will cause the head to swing about the tapered head on one disc and impart slight rotation to the other disc.

9. The combination as defined in claim 4, wherein the pivotal connection of the pivotal member to one disc member includes a pivot element rigidly connected at one end to one member and having a free end, the other member having a recess in which the free end of said pivot element is disposed, and said free end of the pivot element having a tapered roller journaled thereon, said tapered roller being engaged with the recessed member at one side of said recess and shiftable axially in said recess responsive to relative axial movements of said discs.

10. The combination as defined in claim 4, wherein the pivotal member has the form of a lever having a head thereon, said head having a pair of recesses therein, and the members on the discs each having a tapered roller journaled thereon and disposed in the respective recesses, with the tapered rollers eccentrically disposed in the recesses and engaged with the head at the respective opposite sides of said recesses, whereby pivotal movement of the lever will cause the head to swing about the tapered roller on one disc and impart slight rotation to the other disc.

11. In combination, a disc brake including a rotatable housing to be braked having radially extended and axially spaced friction surfaces, a double-disc assembly coaxially arranged within said housing and disposed between the friction surfaces thereof, said double-disc assembly including a pair of discs shiftably mounted for relative rotative and axial shifting movements, camming means between the discs for forcing the discs axially apart into engagement with said housing upon rotation of one disc relative to the other, adjusting means for limiting release movements of said discs, service operating means for effecting initial engagement of the discs with said housing, and auxiliary mechanical operating means interconnected with said discs for effecting engagement of the discs with said housing, said mechanical operating means having a shiftable operating member adapted to be connected to manually operable means for shifting the same, and means for automatically adjusting the connection of said mechanical operating means to said discs responsive to adjustment of the brakes by the first-mentioned adjusting means to maintain the operating member in a substantially constant brake release position.

12. In a disc brake having a pair of disc members disposed in side-by-side relation and mounted for slight rotation of one member relative to the other to effect engagement of the brake, and having camming means for effecting axial separation of the members responsive to such relative rotation, means urging said members together to a brake release position, adjuster means for limiting release movements of the members, and operating means for the members, that improvement wherein the operating means includes mechanical operating means interconnected with said members and having means co-operative with said members for automatically adjusting the mechanical operating means responsive to adjustment of the brake by the adjuster means aforesaid to maintain the mechanical operating means in a substantially constant brake release position.

13. A disc brake as defined in claim 12, wherein the operating means includes a fluid-pressure-operated actuator device operable on said members to effect service engagement of the brake, and the mechanical operating means constitutes auxiliary operating means.

14. A disc brake as defined in claim 12, wherein the operating means includes an annular fluid-pressure-operated actuator device disposed between said members and operable on said members to effect service engagement of the brake, and the mechanical operating means constitutes auxiliary operating means.

15. A disc brake as defined in claim 12, wherein the mechanical operating means includes a lever pivotally connected at one end to one of said members and pivotally connected at a point spaced from said one end to the other of said members, and the means for automatically adjusting the mechanical operating means includes a pivot element connecting the lever to said members at each of the pivotal connections aforesaid, said pivot elements and said lever having cooperative means for maintaining the angular disposition of said lever irrespective of the relative axial spacing between said members.

16. A disc brake as defined in claim 12, wherein the mechanical operating means includes a lever pivotally connected at one end to one of said members and pivotally connected at a point spaced from said one end to the other of said members, and the means for automatically adjusting the mechanical operating means includes a pivot element connecting the lever to said members at each of the pivotal connections aforesaid, said pivot elements each being carried by one of said members and having a head, said lever having a pair of openings in which the respective heads are disposed with each head having one side thereof engaging said lever at one side only of the respective openings, and one of said sides being disposed at an angle to the axis of the respective heads and openings.

17. A disc brake as defined in claim 12, wherein the mechanical operating means includes a lever pivotally connected at one end to one of said members and pivotally connected at a point spaced from said one end to the other of said members, and the means for automatically adjusting the mechanical operating means includes a pivot element connecting the lever to said members at each of the pivotal connections aforesaid, said pivot elements each being carried by one of said members and having a tapered head, said lever having a pair of tapered openings in which the respective heads are disposed in eccentric relation, with one side of the heads engaged with the lever at the opposite sides of the respective openings.

18. A disc brake as defined in claim 12, wherein the mechanical operating means includes a lever pivotally connected at one end to one of said members and pivotally connected at a point spaced from said one end to the other of said members, and the means for automatically adjusting the mechanical operating means includes a pivot element connecting the lever to said members at each of the pivotal connections aforesaid, said pivot elements each having a shank carried by one of said members and also having a head in the form of a roller rotatably journaled on said shank, said lever having a pair of openings in which the respective rollers are disposed, with each roller having one side thereof engaging said lever at one side only of the respective openings, and one of said sides being disposed at an angle to the axis of the respective rollers and openings.

19. A disc brake as defined in claim 12, wherein the mechanical operating means includes a lever pivotally connected at one end to one of said members and pivotally connected at a point spaced from said one end to the other of said members, and the means for automatically adjusting the mechanical operating means includes a pivot element connecting the lever to said members at each of the pivotal connections aforesaid, said pivot elements each including a shank carried by one of said members and a tapered roller journaled on said shank, said lever having a pair of tapered openings in which the respective tapered rollers are disposed in eccentric relation, with one side of the rollers engaged with the lever at the opposite side of the respective openings.

20. Mechanical brake-operating means for shifting a pair of brake elements relatively in one direction and permitting movement of said elements in another direction, and said elements each having an operator supporting member, comprising an operator member adapted to be interposed between the members on the brake elements, means pivotally connecting said operator member to each of said members on the brake elements, at least one of the pivotal connecting means including an axially extended pivot element mounted at one end on one of the members, the other member having an opening therein in which the other end of said pivot element is eccentrically disposed, said pivot element having a surface engaged with a surface of the latter member at one side of the opening, at least one of said surfaces being disposed at an angle to the axis of the pivot element and tending to urge the pivot element towards a concentric position in said opening upon movement of the brake elements in one direction, and an operating arm projecting from said operating member and adapted to be connected to manually controlled means for shifting the operating arm.

21. Mechanical brake-operating means as defined in claim 20, wherein said pivot element and the member on which it is mounted are provided with means for axially adjusting said pivot element.

22. Mechanical brake operating means as defined in claim 20, wherein said pivot element is mounted on the member on one of the brake elements, said operator member being formed with the opening aforesaid, and the end of the pivot element disposed in said opening being provided with a tapered head, said tapered head being disposed in the opening in said operating member.

23. Mechanical brake-operating means as defined in claim 20, wherein said pivot element has the form of a shank rigidly connected to one of said members and having a tapered roller rotatably journaled on said shank and disposed in the opening in the other member.

24. Mechanical brake-operating means as defined in claim 20, wherein said pivot element includes a shank mounted on the member on one of the brake elements, said operator member being formed with the opening aforesaid, and the end of the pivot element disposed in said opening being provided with a tapered roller rotatably journaled on said shank, said tapered roller being disposed in the opening in said operator member.

25. A disc brake of the class described, comprising a rotatable member to be braked having opposed axially spaced and radially extended friction surfaces, a pair of discs coaxially arranged within said member and disposed between said friction surfaces for slight rotative movement of one disc relative to the other and for axial separation of the discs, camming means between the discs for shifting the discs axially apart into engagement with said friction surfaces upon rotation of one disc relative to the other, means biasing said discs to a release position, self-adjuster means cooperatively engaged with said discs for limiting release movements of said discs, and self-adjusting operating means for effecting slight rotation of one disc relative to the other to effect engagement of the brake, said operating means including a lever having a head disposed between the discs, said head being provided with a pair of openings having tapered walls, with said tapered walls of one opening converging towards one disc and the tapered walls of the other opening converging towards the other disc, a pivot element fixedly mounted on each disc and having a tapered end eccentrically disposed in one of the tapered openings in the head aforesaid, said tapered ends being engaged with said head at the opposite sides of the respective openings, and said lever being adapted to be connected to manually controlled means for rocking the lever to engage the brake.

References Cited in the file of this patent

UNITED STATES PATENTS 2,322,061  Schnell _____ June 15, 1943